Patented June 23, 1931

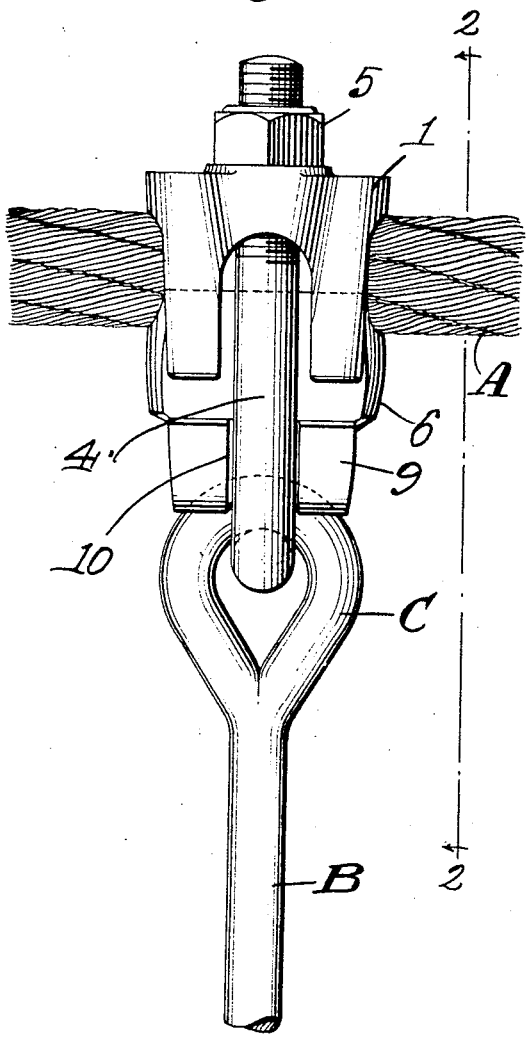
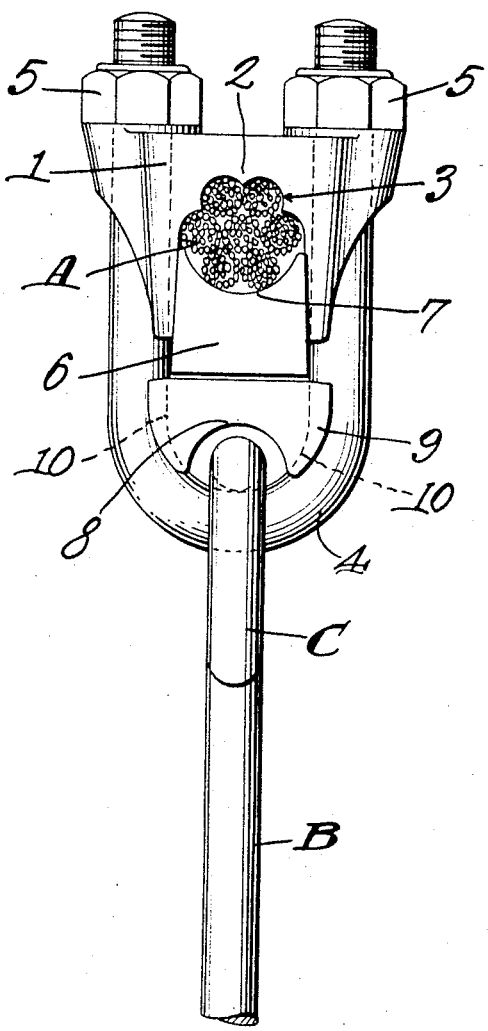
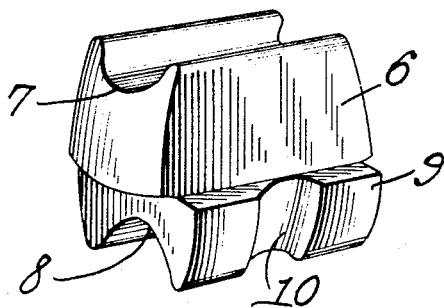

1,811,154

UNITED STATES PATENT OFFICE

FRANK WARD REILLY, OF CHATTANOOGA, TENNESSEE, ASSIGNOR TO WILLIAMSPORT WIRE ROPE COMPANY, A CORPORATION OF PENNSYLVANIA

FITTING FOR LIGHT DUTY SUSPENSION HANGERS

Application filed January 10, 1930. Serial No. 419,921.

This invention relates to suspender fittings designed primarily for use in supporting the hangers from the main or span cables of suspension bridges and the like.

One of the objects of the invention is to provide a fitting of this character designed for light duty and which, in order to cheapen production, utilizes a standard wire rope clip as one of its main elements.

Another object is to combine with the clip a simple and efficient means whereby the wire rope can be tightly gripped, the grooves or recesses ordinarily provided in the clip being utilized as a means for preventing the fitting from sliding longitudinally of the engaged wire rope after it has been properly applied thereto.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of a portion of a span rope or cable, a portion of a hanger, and the fitting which constitutes the present invention joining them.

Figure 2 is a section on line 2—2, Figure 1.

Figure 3 is a perspective view of the gripping blocks.

Referring to the figures by characters of reference, A designates a portion of a main span rope or cable of the type usually employed in bridge construction. It is the practice to suspend hangers from these ropes and fasten them to the floor system at their lower ends. Where comparatively short hangers are used, metal rods can be employed, but where long hangers are necessary, lengths of cable with socket fittings at their ends can be substituted for the rods. In the structure illustrated, a hanger in the form of a rod B has been shown, this being provided at its upper end with an eye C.

For the purpose of attaching the hanger to the cable A a fitting of novel construction has been designed. This fitting includes a standard wire rope clip indicated at 1 the saddle portion 2 of which is formed with the usual grooves 3 for receiving the adjacent portions of the cable A. A U-bolt 4 has its end portions adjustably mounted in opposed portions of the clip where they are held by nuts 5 in the usual way. This U-bolt is extended through and adapted to support the eye C of hanger B.

For the purpose of holding the fitting properly assembled with the cable there is employed a gripping block 6 formed preferably of a casting having a recess 7 designed to receive a portion of the cable A. The upper portion of this block extends into the lower portion of the clip 1. The lower portion of the block has a recess 8 into which the upper portion of the eye C is adapted to extend. The sides of the lower portion of block 6 are extended laterally as shown at 9 and formed with grooves 10 constituting seats for the side portions of the U-bolts 4. These side portions are curved so as to conform to the curvature of the adjacent portions of the U-bolt. This will be apparent by referring particularly to Figure 2.

In practice, the parts of the fitting are assembled loosely on the cable with the hanger B suspended therefrom. The fitting is then placed at the point where it is to be attached to the cable. Thereafter, the U-bolt is tightened by means of the nuts 5, thus causing the block 6 to be drawn toward the saddle portion 2 of clip 1 with the result that the cable will be tightly gripped and portions thereof will extend into the grooves 3.

Thus the fitting will be held against movement longitudinally of the engaged cable. Furthermore the hanger will be supported securely by the fitting and, as the clip presents a large surface to the cable, it will be apparent that said cable is relieved from excessive bending and high unit bearing pressure which would result should the cable be extended directly through the eye C of hanger B.

Importance is attached to the fact that an ordinary cable clip 1 is employed in the production of this fitting. These clips can be obtained in quantities at low cost so that the completed fitting can be produced at less expense than would otherwise be possible.

What is claimed is:

1. A fitting of the class described including a clip for straddling a cable, said clip having grooves for the reception of portions of the cable, a block movably mounted in the clip having a cable-receiving recess and a recess for the reception of one end portion of a hanger, and a U-bolt straddling the block and adjustably connected to the clip for binding a cable between the grooved surface of the clip and the recessed end of the block, said bolt constituting means for extending through and engaging a hanger.

2. A device of the class described including a clip for straddling a cable, a block movably mounted in the clip, said block having upper and lower end recesses and opposite vertical grooves, a U-bolt seated in the grooves and extending across the lower recess and means for adjustably connecting the U-bolt to the clip to bind a cable between the upper recessed end of the block and the clip.

3. A fitting for coupling a hanger to a span cable or the like, including a clip adapted to straddle the cable, said clip having cable-receiving grooves, a block insertable into the clip and having a recess in each end and opposed grooves, a U-bolt seated in the groove and extending across one of the recesses for engagement with one end of a hanger seated in said recess, and means for adjusting the U-bolt relative to the clip to bind the cable between the clip and one of the recessed ends of the block.

4. A fitting for coupling a hanger to a span cable or the like, including a clip adapted to straddle the cable, said clip having cable-receiving grooves, a block insertable into the clip and having a recess in each end and opposed grooves, a U-bolt seated in the groove and extending across one of the recesses for engagement with one end of a hanger seated in said recess, and means for adjusting the U-bolt relative to the clip to bind the cable between the clip and one of the recessed ends of the block, those portions of the block engaged by the U-bolt being shaped to conform to the contour of the engaged portion of the U-bolt, the said U-bolt constituting means for holding the block against displacement relative to the clip.

In testimony that I claim the foregoing as my own, I have hereto affixed my signature.

FRANK WARD REILLY.